(12) United States Patent
Chapel et al.

(10) Patent No.: US 6,554,550 B2
(45) Date of Patent: Apr. 29, 2003

(54) TANDEM TAP AND METHOD FOR CUTTING SCREW THREADS

(75) Inventors: Penny E. Chapel, Roscoe, IL (US); Ricky D. Rath, Beloit, WI (US)

(73) Assignee: North American Tool Corporation, South Beloit, IL (US)

( * ) Notice: Subject to any disclaimer, the term of this patent is extended or adjusted under 35 U.S.C. 154(b) by 13 days.

(21) Appl. No.: 09/949,350

(22) Filed: Sep. 7, 2001

(65) Prior Publication Data

US 2003/0049081 A1 Mar. 13, 2003

(51) Int. Cl.$^7$ .................................. B23G 5/06
(52) U.S. Cl. .................. 408/1 R; 408/59; 408/222; 408/224; 470/198
(58) Field of Search ............... 408/1 R, 57, 59, 408/222, 224, 229, 230; 470/198, 199

(56) References Cited

U.S. PATENT DOCUMENTS

| 347,864 | A | * | 8/1886 | Berg | 408/219 |
|---|---|---|---|---|---|
| 379,213 | A | * | 3/1888 | Firth et al. | 408/224 |
| 420,189 | A | * | 1/1890 | Clark et al. | 408/222 |
| 3,604,035 | A | * | 9/1971 | Hendricks | 470/96 |
| 4,762,444 | A | * | 8/1988 | Mena | 408/59 |
| 5,993,120 | A | * | 11/1999 | Giessler | 408/59 |

FOREIGN PATENT DOCUMENTS

| SU | 1006119 A | * | 3/1983 | 470/198 |
|---|---|---|---|---|

* cited by examiner

Primary Examiner—Daniel W. Howell
(74) Attorney, Agent, or Firm—Leydig, Voit & Mayer, Ltd.

(57) ABSTRACT

A tandem tap for cutting screw threads into a bore comprises straight flutes with a spiral point along the front section for pushing the chips generated thereby forward and spiral flutes along the rear section for removing the chips generated thereby rearward in an opposite direction. The tap prevents build up of chips in the transition area between front and rear cutting sections of the tap.

17 Claims, 6 Drawing Sheets

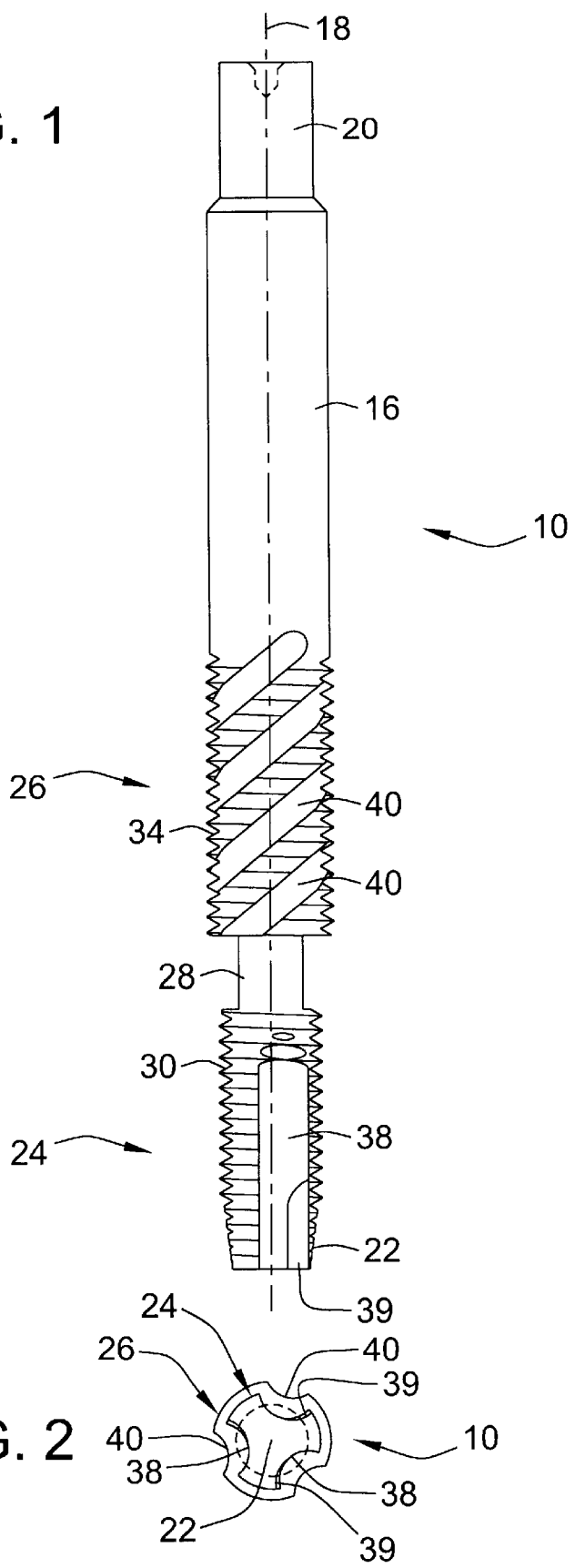

TANDEM TAP AND METHOD FOR CUTTING SCREW THREADS

FIELD OF THE INVENTION

The present invention relates generally to taps for cutting screw threads into stock material, and more particularly relates to tandem cutting taps having multiple sections for cutting threads of differing thread characteristics.

BACKGROUND OF THE INVENTION

Taps are used to cut screw threads into the inner wall of a formed bore in stock material. Tandem taps are a special type of tap that includes two or more threaded sections for creating internal threads. Typically, tandem taps are utilized to create threads of the same pitch, but at different outside diameters that share a common axis. Tandem taps can also be utilized to facilitate tapping of difficult thread forms, such as Acme threads, by combining graduated thread forms from one section of the tap to the next.

While tandem taps have the advantage of cutting two sets of threads with one tapping or work operation (as opposed to two work operations) and automatic axial alignment of two different sets of threads that are being cut, tandem taps of the prior art have had the drawback of frequently experiencing failure or tap breakage. Tandem taps frequently break when chip material builds up in the transition area between the front and the back sections of the tandem tap.

BRIEF SUMMARY OF THE INVENTION

It is an objective of the present invention to reduce the likelihood of tap breakage in tandem taps due to chip material buildup in the transition area between front and back sections of the tap.

In accordance with these and other objectives, the invention comprises tandem tap for cutting internal threads on an inner wall of a bore that simultaneously moves chip material in two different directions when cutting. The tandem tap comprises an elongate body for rotation about an axis extending between a workable end and a tip end. The elongate body has a first cutting section toward the tip end and a second cutting section between the first cutting section and the workable end. The workable end is adapted to be worked for rotating the tandem tap. The first and second cutting sections include external cutting threads of different thread characteristics wherein the first and second cutting sections are adapted to cuts threads having different characteristics. The tap includes at least one external first flute for chip clearance that interrupts the external threading on the first cutting section. The first flute extends axially to the tip end. When the first cutting section is cutting threads, the chips produced thereby are moved in a forward direction. The tap also includes at least one spiral flute interrupting the external threading on the second cutting section. The spiral flute follows a helical path leading toward the workable end. When the second cutting section is cutting threads, the chips produced thereby are moved in a rearward direction opposite the forward direction.

The present invention is also directed toward an improved method for cutting threads into an inner wall of a bore by rotating a tandem tap inside the bore. The method comprises: cutting a first screw threading into the inner wall, thereby producing a first set of chips and simultaneously cutting a second threading into the inner wall in axial spaced relation to the first threading. The second screw threading is of a different thread characteristic than the first screw threading, thereby producing a second set of chips. The method further comprises moving the first set of chips in a forward direction for clearing the first set of chips; and simultaneously moving the second set of chips in a rearward direction opposite the forward direction for clearing the second set of chips.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1 is a side elevation view of a tandem tap in accordance with a preferred embodiment of the present invention.

FIG. 2 is a tip end view of the tandem tap illustrated in FIG. 1.

Figure 3:
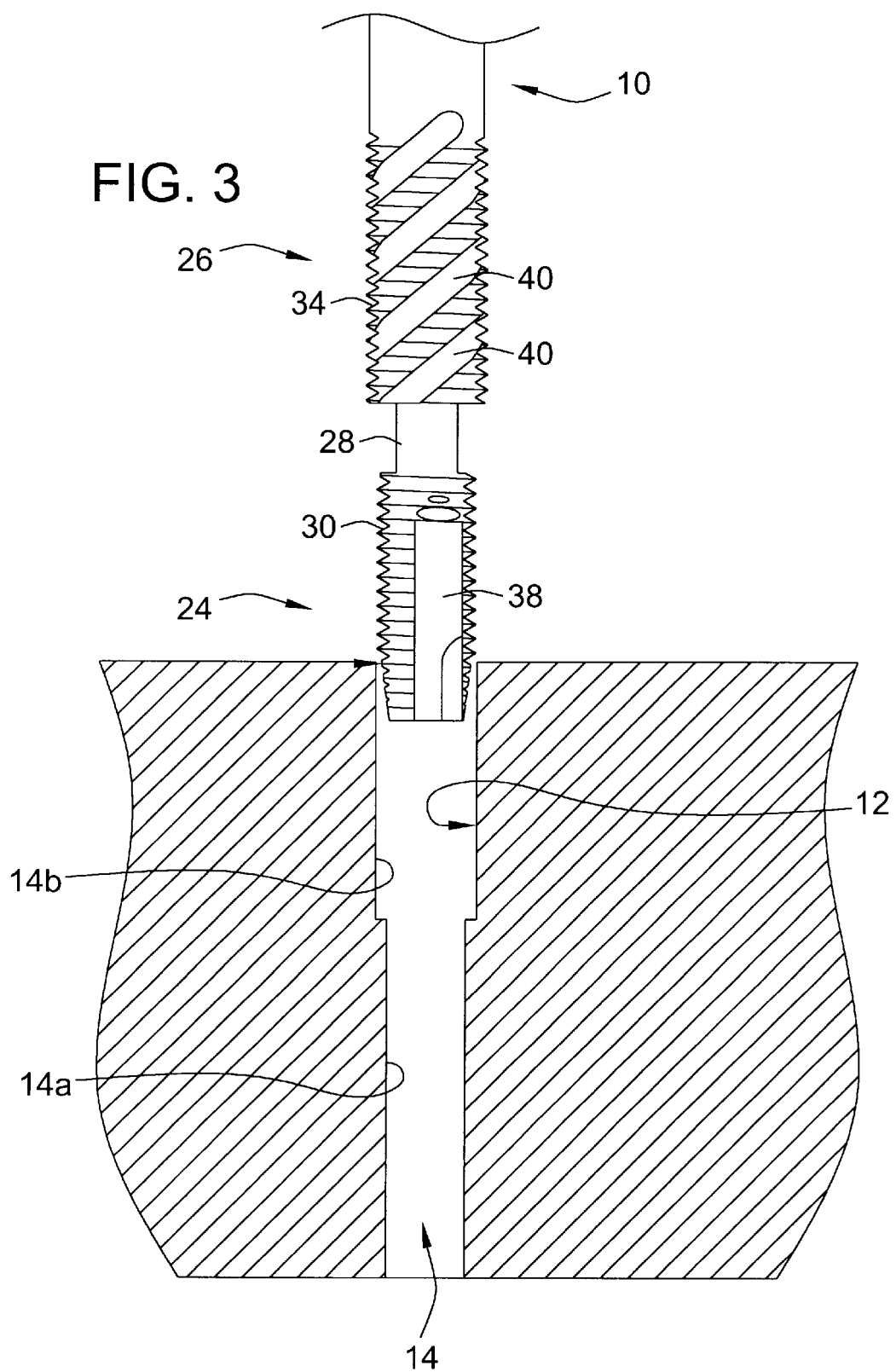
FIGS. 3–6 are side elevation views of the tandem tap of FIG. 1 in use in a formed bore shown in cross section, with each subsequent figure showing a progression of the work operation for cutting threads.
Figure 4:
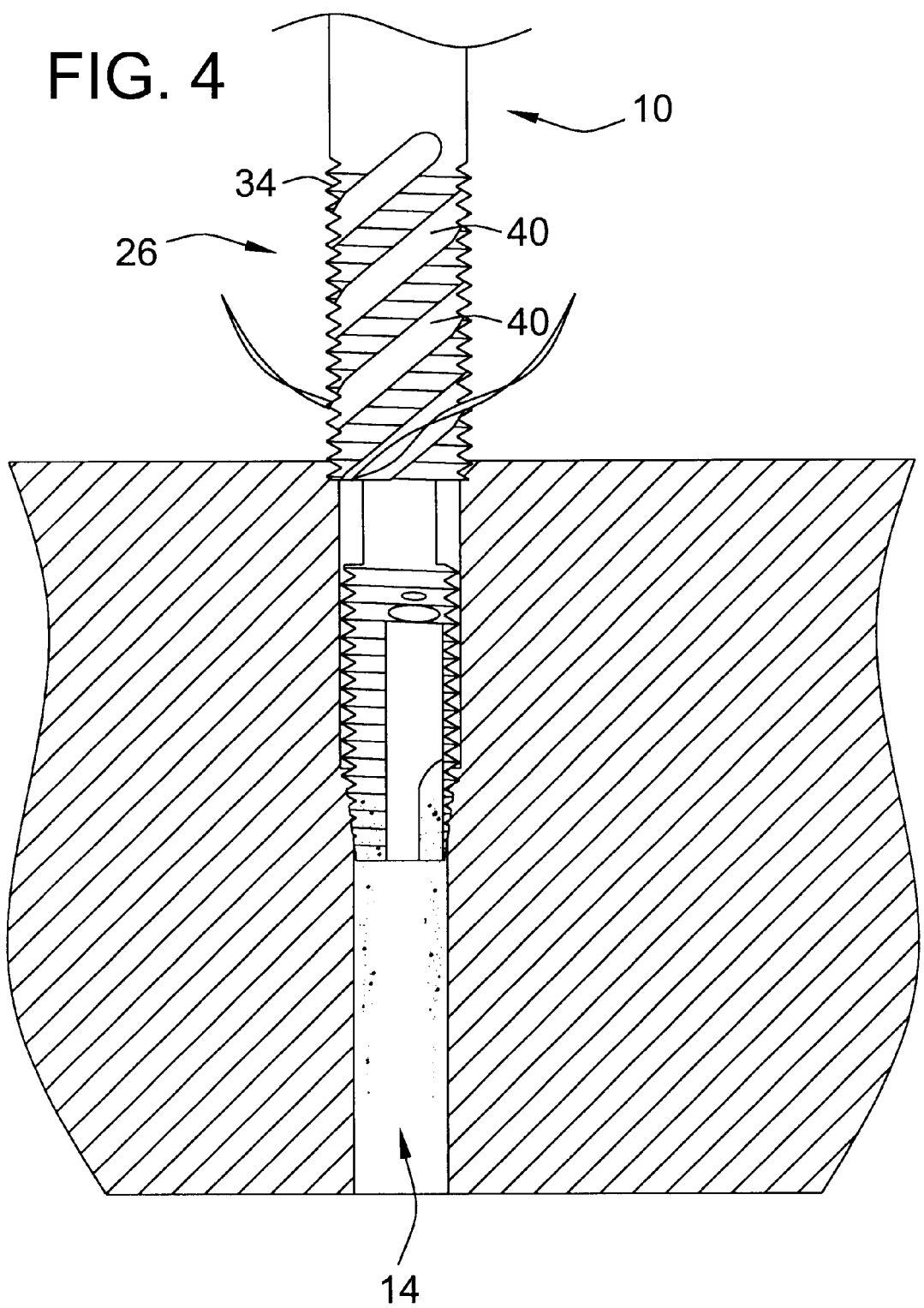
Figure 5:
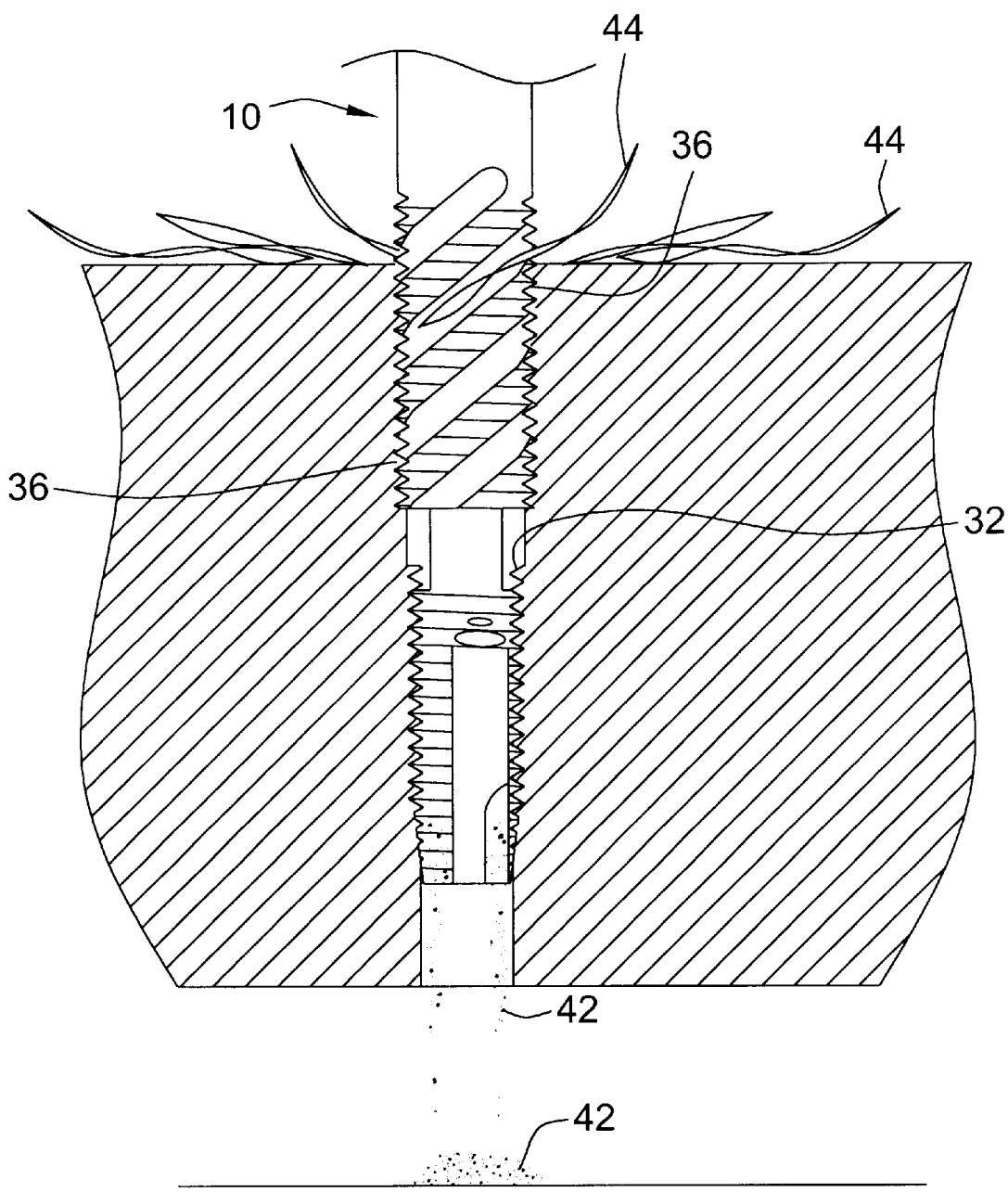
Figure 6:
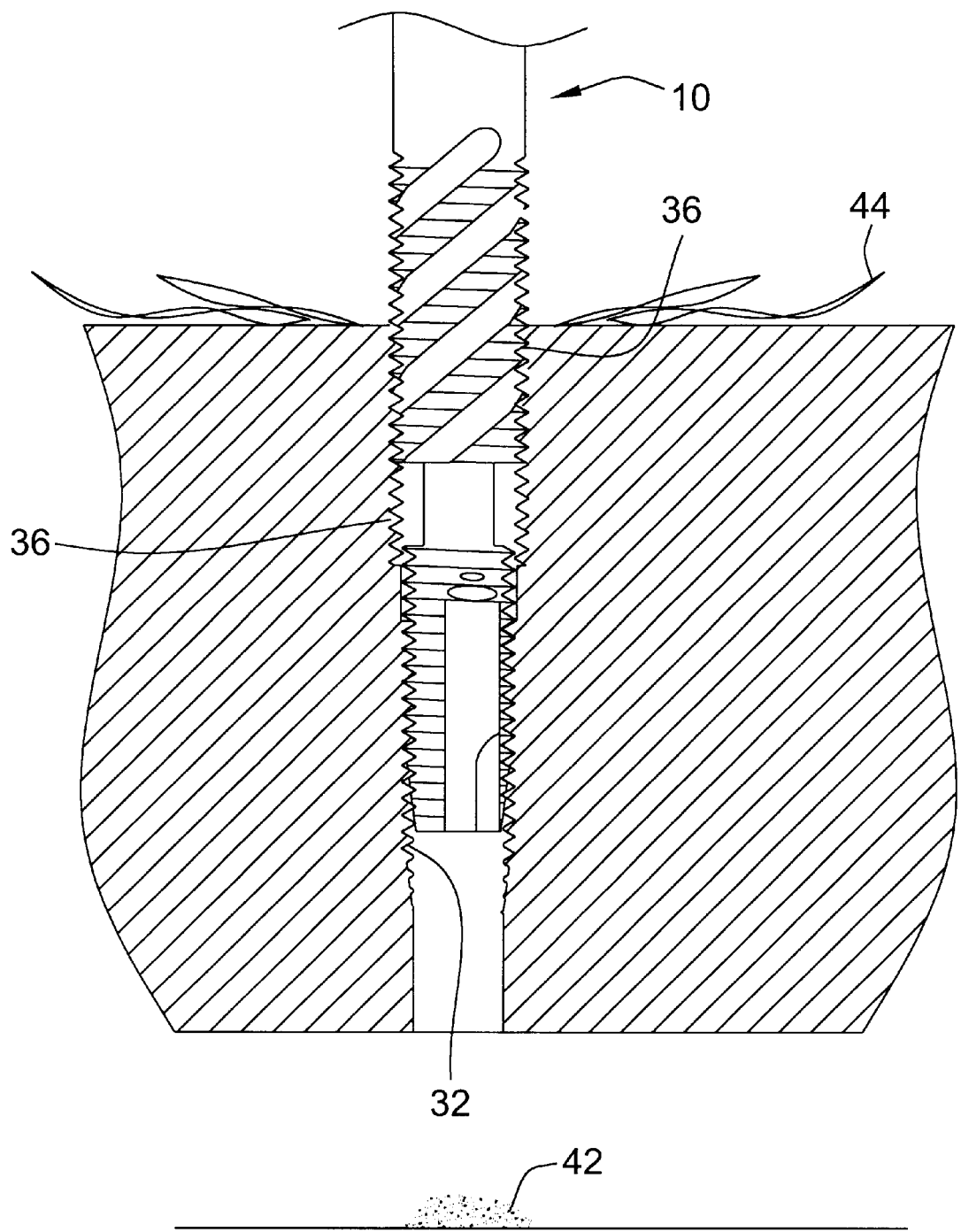

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to the Figures, a preferred embodiment of the present invention has been illustrated as a tandem tap 10 for cutting threads into the inner wall 12 of a formed bore 14. The tandem tap 10 is made of a unitary, elongate body 16 having an axis 18 of rotation. The elongate body 16 extends between a workable end 20 that is adapted to be gripped and worked by a tool (e.g. a hand tool, a power tool such as a drill, or a machine tool) and a tip end 22 that is adapted to be first inserted into the bore 14 when it is desired to tap the bore with threading.

The elongate body 16 includes a front cutting section 24 toward the tip end and a rear cutting section 26 axially between the front cutting section 24 and the workable end 20. The elongate body 16 may also include a non-threaded stem portion 28 for separating the cutting sections 24, 26 at a desired axial distance. The tip end 24 is chamfered and converges forwardly such that it centers the tandem tap 10 when inserted into the formed bore 14. The front cutting section 24 includes external screw threading 30 of a first thread characteristic for cutting threads 32 of the first thread characteristic into the bore 14. The rear cutting section 26 also includes external screw threading 34, but of a different, second thread characteristic for cutting threads 36 of the second thread characteristic into the bore 14.

In the disclosed embodiment, the tandem tap 10 is configured to cut axially spaced sections of threads 32, 36 that are of different diameters but the same pitch, with smaller diameter of threads 32 for the smaller diameter bore section 14a and larger diameter threads 36 for the larger diameter bore section 14b. Thus, the different thread characteristic between cutting sections 24, 26 of the disclosed embodiment is one of diameter.

Although one form of tandem tap is illustrated, it will be readily appreciated to those skilled in the art, that the invention is also applicable to other forms or applications of tandem taps. For example, the invention is applicable to and includes tandem taps that cut difficult thread forms in a sequential process, such as Acme threads, by combining graduated thread forms from one section of the tap to the next. According to this alternative embodiment, the different graduation between cutting sections would form the different thread characteristic. Generally a tandem tap is a cutting tap with two or more threaded sections having different thread characteristics.

To provide for a cutting face/edge and a clearance area for generated waste chips 42, 44, each cutting section includes at least one, and often two or more flutes 38, 40 spaced at selected angular intervals about the rotational axis 18. The forward section 24 includes straight flutes 38 that interrupt the external screw threading 30 and extend longitudinally forward through the tip end 22. The straight flutes 38 are adapted to convey chips 42 forward toward the tip end 22 and may converge radially inwardly (getting deeper) as the straight flutes 38 extend to the tip end 22. Toward the tip end 22, each straight flute 38 includes a spiral point 39, which is angular fluting in the cutting face of the front cutting section 24. The spiral point 39 is formed at an angle with respect to the tap axis with an opposite hand of curvature relative to the hand of rotation which causes threads to be cut.

The rear cutting section 26 includes spiral flutes 40 that interrupt the external screw threading 34 and extend along a helical path throughout the entire length of the rear cutting section toward the workable end 20. The spiral flutes 40 are formed at the same hand as the external screw threading 34 but at a different and steeper helix, such that chips 44 move rearward relative to the tap 10 away from the plunging movement of the tap 10 during thread cutting operations. The spiral flutes may intersect a plane perpendicular to the axis 18 at an angle of between about 8 and about 52 degrees. It is an advantage that directing the chips 44 created by the rearward section away from the transition area 46 between front and rear sections 24, 26 that chips 44 are less likely to build up in the transition area 46. This provides a lesser likelihood that the tap 10 will break and/or may provide for cleaner threads 32, 36 being formed into the inner wall 12 of the bore 14.

The tap 10 is used by inserting the tap 12 into the formed bore 14. The workable end 20 is rotated by an appropriate machine tool, hand tool or power tool (not shown) to cut the threads 32, 36 into the bore 14. As the tap 10 is being worked, the tap is creating threads 32, 36 of different thread characteristics by using separate front and rear cutting sections 24, 26 that have correspondingly different thread characteristics. Each cutting sections 24, 26 has a cutting face along one wall of each flute that generates its own waste chips 42, 44. The waste chips 42 generated by the front cutting section 24 are moved forward and cleared with the spiral points 39 of the straight flutes 38. The waste chips 44 generated by the rear cutting section 26 are moved rearward and cleared with the spiral flutes 40. By moving the chips 42, 44 in opposite directions, the tap 10 prevents chips from building up in the transition area 46 between the cutting sections 24, 26.

It will be appreciated that the tap 10 can be designed to meet the particular tapping application. The number of flutes needed depends upon the demands of the intended application and can be modified accordingly without departing from the scope of the invention (e.g. type of material, depth of thread being produced, coolant or lubricant being used, etc.). Additional, the tap 10 of the invention may also include the addition of coolant-through flute designs which could be used for difficult tapping applications like deep hole tapping, where chip size control and evacuation become more critical.

Figure 7:
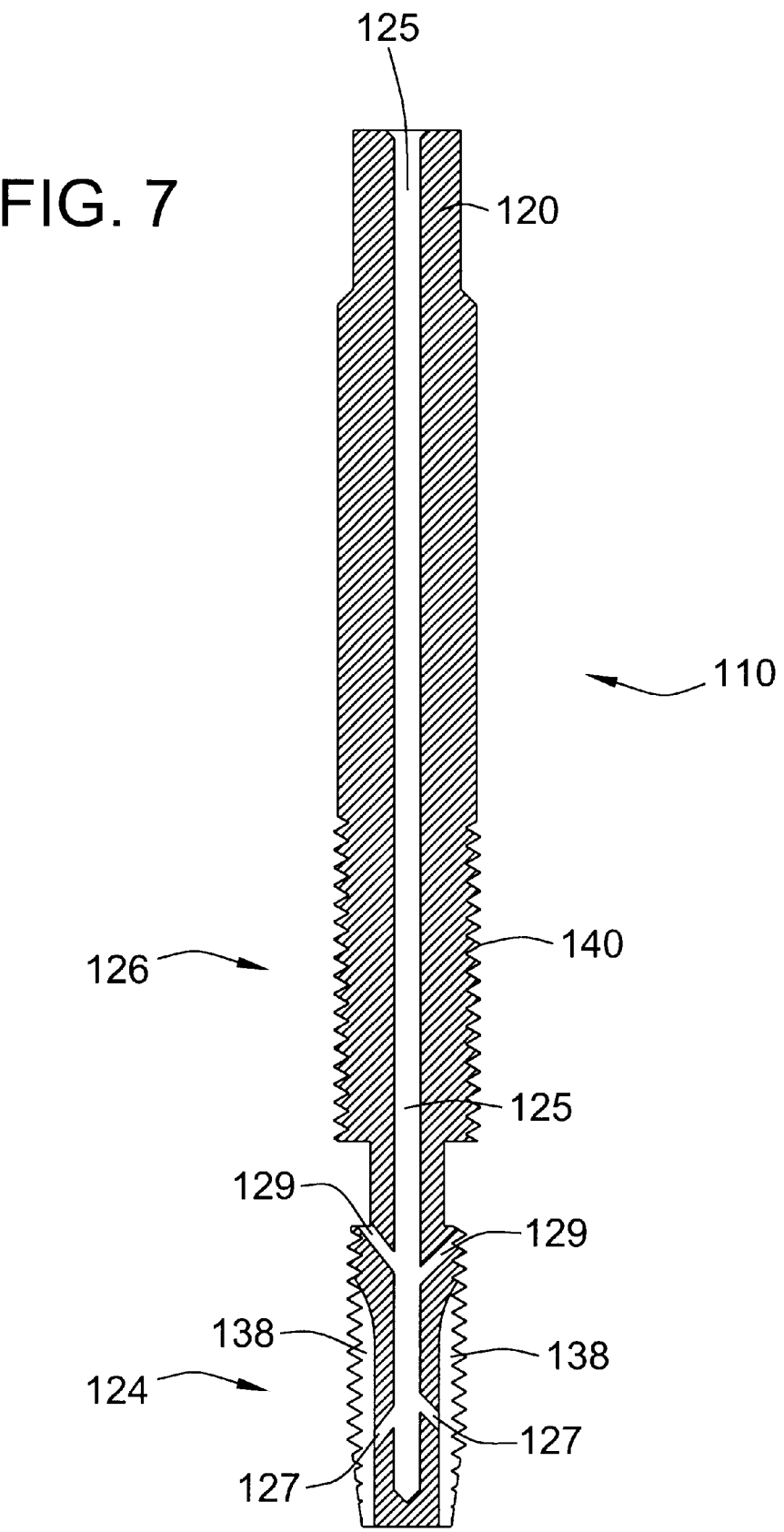
FIG. 7 is a cross section of a possible alternative embodiment of the present invention.

While certain means in the form of a spiral point and spiral flutes has been illustrated in a preferred embodiment for moving chips in opposite directions with different sections of a tandem tap 10, and the preferred embodiment of the tap 10 is tested and now known to solve the various problems, the inventors have thought of other means that could also move the chips in a desired direction. For example, it might be possible to place spiral flutes on the front cutting section 24 as the mobilizing means that are of opposite hand the spiral flutes 40 on the rear cutting section 26. Also, hydraulic fluid mobilized in opposite directions to flush chips in opposite directions may also work. An embodiment of a tap 110 according to this alternative embodiment is illustrated in FIG. 7. This tap 110 also similarly includes a front cutting section 124 toward the tip end and a rear cutting section 126 axially between the front cutting section 124 and the workable end 120. A center passage 125 for transporting pumped or pressurized hydraulic lubricating oil or cooling fluid is provided in this embodiment. The center passage 125 outlet ports 127, 129 directed radially outward for transmitting oil to the flutes 138, 140 (in this case straight flutes 138, 140 for both front and rear cutting sections 124, 126). The lower outlet ports 127 may be angled axially toward the tip end in communication with the straight flutes 138 while the upper outlet ports 129 may be angled axially toward the workable end 120. In operation, oil under pressure is pumped through the passage 125 to provide mobilizing means in two directions. In particular, oil transmitted through the lower outlet ports 127 is transmitted by the lower straight flutes 138 to mobilize chips generated by the front cutting section 124 forwardly. Oil transmitted through the upper outlet ports 127 is transmitted to the transition region between sections 124, 126 and then through the upper flutes 140 to mobilize chips generated by the rear cutting section 126 rearwardly. Although the alternative embodiment illustrates straight flutes 138, 140, it will be appreciated that two way oil mobilization may also be used in addition to spiral points and/or spiral flutes to assist in the removal of material.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A tandem tap for cutting internal threads on an inner wall of a bore, the tap comprising:

an elongate body for rotation about an axis, the elongate body extending between a workable end and a tip end, the elongate body including a first cutting section toward the tip end and a second cutting section between the first cutting section and the workable end, the workable end adapted to be worked for rotating the tandem tap, the first and second cutting sections including external threading of different thread characteristics wherein the first and second cutting sections are adapted to cuts threads having different characteristics;

at least one first flute interrupting the external threading on the first cutting section, the first flute extending axially to the tip end, wherein when the first cutting section is cutting threads forming a plurality of chips, the chips are moved in a forward direction; and at least one spiral flute interrupting the external threading on the second cutting section, the spiral flute following a helical path leading toward the workable end, wherein when the second cutting section is cutting threads forming a plurality of chips, the chips are moved in a rearward direction opposite said forward direction.

2. The tandem tap of claim 1 further comprising a spiral point grind formed into the first flute, the spiral point grind including angular fluting formed at an oblique angle relative to a plane perpendicular to the axis and of an opposite hand relative to rotation about the axis.

3. The tandem tap of claim 1 wherein the first and second cutting sections have external threading that are of different diameters adapted to cut different diameter threads into different diameter bore sections of the bore.

4. The tandem tap of claim 1 wherein the first and second cutting sections are of the same diameter but combine graduated thread forms from first cutting section to the second cutting section for forming difficult thread forms.

5. The tandem tap of claim 1 wherein the first flutes taper radially outwardly as the first flutes extend from the tip end toward the second cutting section.

6. The tandem tap of claim 1 wherein the spiral flute intersects a plane perpendicular to said axis at an angle of between about 8 and about 52 degrees.

7. The tandem tap of claim 1 wherein the at least one spiral flute comprises at least two of the spiral flutes, and wherein the at least one first flute comprises at least two of the first flutes.

8. The tandem tap of claim 1 wherein the elongate body further comprises a non-threaded stem section axially between the first and second cutting sections for spacing the first and second cutting sections apart axially.

9. A tandem tap for cutting threads into an inner wall of a bore by rotating the tandem tap inside the bore, the tandem tap comprising;

first means for cutting a first screw threading into the inner wall, thereby producing a first set of chips;

second means for simultaneously cutting a second screw threading into the inner wall in axial spaced relation to the first threading, the second screw threading being different thread characteristic than the first screw threading, thereby producing a second set of chips; and third means for moving the first set of chips in a forward direction for clearing the first set of chips; and fourth means for moving the second set of chips in a rearward direction opposite said forward direction for clearing the second set of chips.

10. The tandem tap of claim 8 wherein the first means and second means cut first and second screw threading that are of different diameters, whereby different diameter threadings are cut into different diameter bore sections of the bore.

11. The tandem tap of claim 8 wherein the first means and second means cut first and second screw threading that are of the same diameter but combine graduated thread forms from the first means to the second means for forming difficult thread forms.

12. The tandem tap of claim 8 further comprising spacing means between the first and second means for axially spacing the cutting of the first and second screw threading at a predetermined axial spacing.

13. The tandem tap of claim 8 wherein the third mean comprises at least one spiral point and the fourth means and at least one spiral flute.

14. The tandem tap of claim 8 wherein the third and fourth means comprises fluid flushing chips in opposite directions.

15. A method for cutting threads into an inner wall of a bore by rotating a tandem tap inside the bore, the method comprising;

cutting a first screw threading into the inner wall, thereby producing a first set of chips;

simultaneously cutting a second threading into the inner wall in axial spaced relation to the first threading, the second screw threading being of a different thread characteristic than the first screw threading, thereby producing a second set of chips; and moving the first set of chips in a forward direction for clearing the first set of chips; and moving the second set of chips in a rearward direction opposite said forward direction for clearing the second set of chips.

16. The method of claim 14 wherein the cutting steps further include forming the first and second screw threading at different diameters, whereby different diameter threadings are cut into different diameter bore sections of the bore.

17. The method of claim 15 wherein the cutting steps further include forming the first and second screw threading at the same diameter and combining graduated thread forms for forming difficult thread forms of a single diameter.

* * * * *